United States Patent [19]

Zahornasky et al.

[11] 4,124,849
[45] Nov. 7, 1978

[54] POSITIONING SYSTEM

[76] Inventors: Vincent T. Zahornasky, 9 Scott Ave., New Hartford, N.Y. 13413; Nelson S. Allan, III, 2639 Edgewood Rd., Utica, N.Y. 13501

[21] Appl. No.: 102,804

[22] Filed: Dec. 30, 1970

[51] Int. Cl.² ............................ G01S 9/14; F41G 3/00
[52] U.S. Cl. ................................. 343/7 G; 89/41 SW; 343/7.3
[58] Field of Search .................... 343/7 A, 7 ED, 7.3, 343/6 R, 12 MD, 7 G; 89/41 SW

[56] References Cited

U.S. PATENT DOCUMENTS

| | | | |
|---|---|---|---|
| 2,745,095 | 5/1956 | Stoddard | 343/6 R |
| 3,166,745 | 1/1965 | Engledew et al. | 343/7 A |
| 3,564,547 | 2/1971 | Dent | 343/7.3 |
| 3,928,850 | 12/1975 | Pollack et al. | 343/7.3 |

OTHER PUBLICATIONS

Skolnik, *Radar Handbook*, McGraw-Hill, 1970, pp. 21-22.

*Primary Examiner*—T.H. Tubbesing

[57] ABSTRACT

A positioning system is provided in which a three channel monopulse radar measures the velocity, azimuth and elevation of a target around which a first range gate is placed. In addition, a second range gate is placed near the target to receive energy from a burst of projectiles to measure velocity of the burst. Signals are supplied from the radar to a computer which determines a lead angle for the aiming of a positionable cannon. Outputs of the computer are delivered to control means, which aim a gun.

10 Claims, 2 Drawing Figures

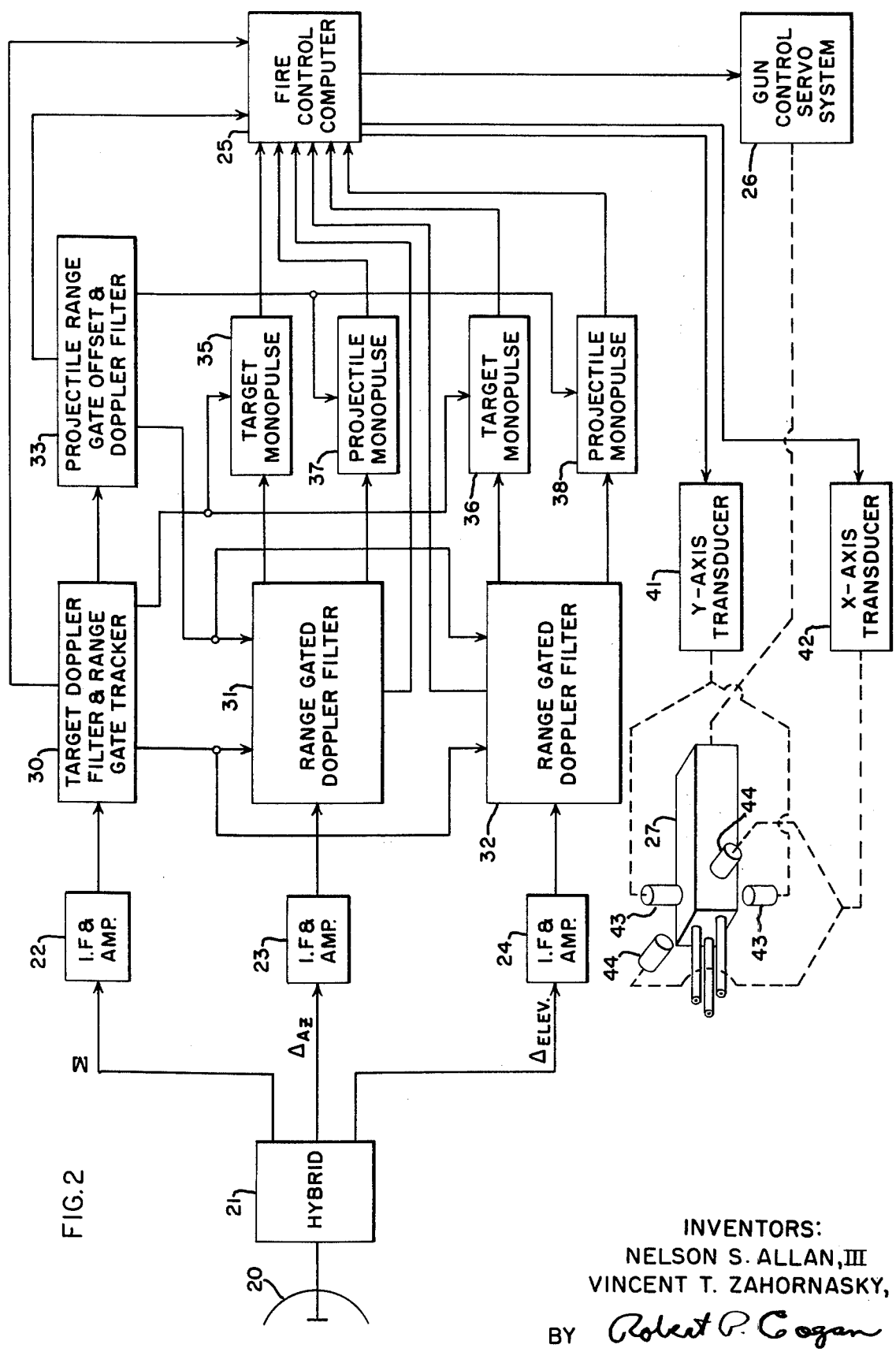

POSITIONING SYSTEM

BACKGROUND OF THE INVENTION

This invention relates to reflected wave object detection systems, and more particularly to such systems in which velocity and angular misdistance are measured.

In the field of gunnery, a cannon is aimed in response to output signals from a fire control computer. A radar system measures the position and velocity of a target and provides information indicative thereof to the fire control computer. Computations performed by the fire control computer must take into account the velocity of projectiles fired from the aircraft in order to compute a lead angle. The lead angle is the angle measured from the aircraft between the position of the target at the time the measurement is made and its expected position at the time projectiles will reach the target. Present systems factor a parameter into the computations performed by the fire control computer indicative of a nominal projectile velocity. This nominal projectile velocity can differ from the actual velocity of projectiles directed from the aircraft cannon toward the target due to several causes. For example, atmospheric effects, lot differences in projectiles, cannon barrel wear and other variations can cause the actual projectile velocity to differ from the nominal velocity. Thus, the fire control computer utilizes an inaccurate indication of the projectile velocity in its computations, and errors are caused in lead angle computation. Such errors lead to an inability to hit the target, conceivably leading to disastrous results.

SUMMARY OF THE INVENTION

It is therefore an object of the present invention to provide a positioning system in which the actual velocity of projectiles directed toward a target is measured.

It is a more specific object of the present invention to provide a positioning system in which the velocity of a burst of projectiles at a range approximately equal to the range of the target is measured.

It is another object, in one form of the invention, to provide one radar which performs measurements on both a target and burst of projectiles.

It is another object of the present invention to provide a system of the type described, in which the radar is provided with first and second range gates which are positionable.

It is another more specific object of the present invention to provide a system of the type described, in which first and second range gates are moveable together.

It is a further object of the present invention to provide an airborne fire control system in which information indicative of projectile velocity is provided to a fire control computer in real time.

It is an additional object of the present invention to provide a cannon positioning system equally suited for use with single barrel or multibarrel cannon.

It is a further object of the present invention to provide a new method for updating fire control equations in a fire control computer.

It is also another object of the present invention to provide a method for providing an indication of the angular misdistance between a target and burst of projectiles.

Briefly stated, in accordance with the present invention, there is provided a fire control system for positioning a steerable cannon in which the projectile velocity and angular error between bursts of projectiles and a target is measured by a radar and in which lead angle computations are performed and in which a positionable cannon is aimed in response to these computations. In one form of the invention, a three channel monopulse radar is provided with a first range gate for performing measurements on the target and a second range gate for determining projectile velocity. Target position and velocity and projectile velocity are measured and provided to a fire control computer. A lead angle is computed and outputs indicative thereof are provided to a control system which aims a steerable cannon.

BRIEF DESCRIPTION OF THE DRAWINGS

The foregoing objects and the features of novelty of the present invention are achieved by the methods and means pointed out with particularity in the concluding portion of the specification. The invention, both as to its organization and manner of operation may be further understood by reference to the following description taken in with connection with the following drawings.

Of the drawings:

FIG. 2 is a block diagramatic representation of a system constructed in accordance with the present invention.

DESCRIPTION OF THE PREFERRED EMBODIMENT

Figure 1:
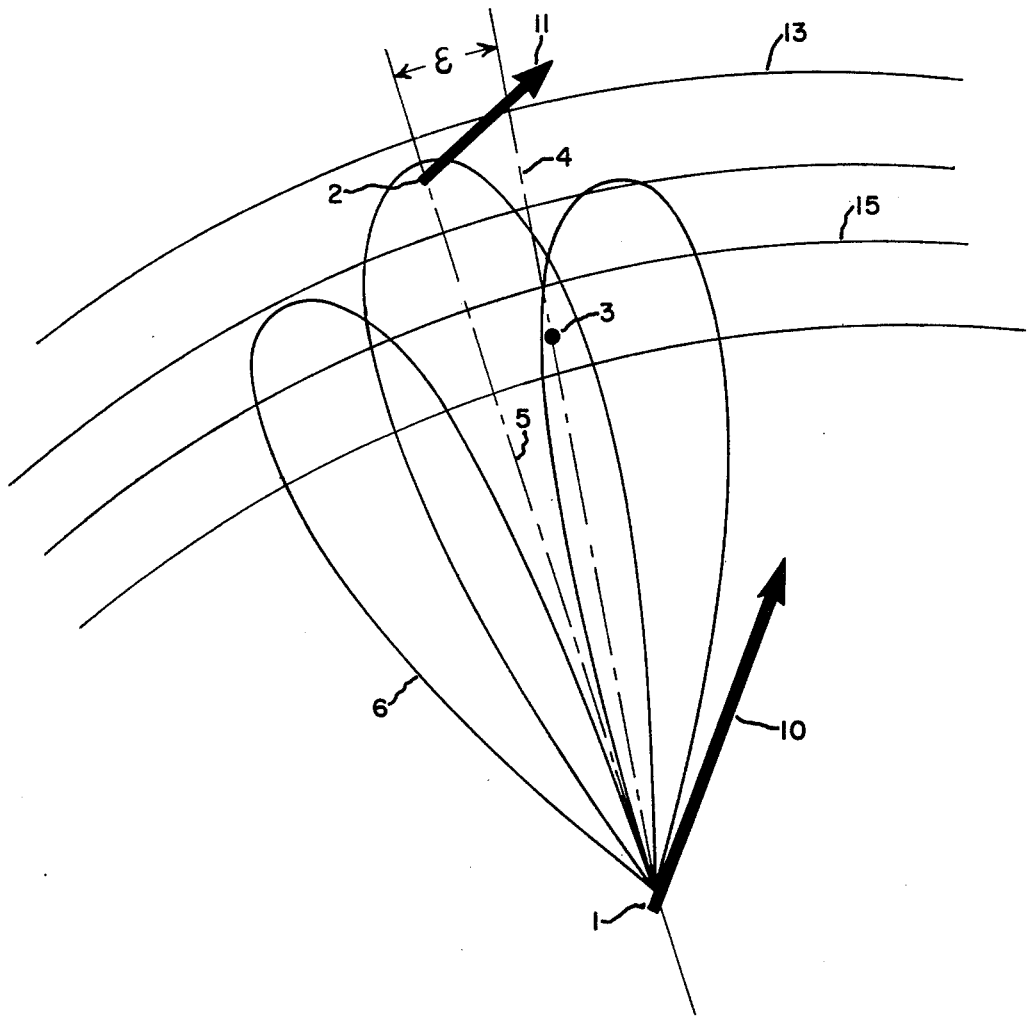
FIG. 1 is an illustration of an application of the present invention.

In the most general case, the radar and gun may be on a moving platform such as an aircraft, helicopter or ship.

In FIG. 1, there is illustrated an aircraft 1 tracking a moving target 2, for example, another aircraft. A projectile or burst of projectiles 3 is fired from a cannon (illustrated in FIG. 2) toward the point where the target 2 is expected to be when the projectile burst 3 reaches the range of the target 2. The angle as measured from the aircraft 1 between the position of the target 2 when its position is measured and the position on the target 2 at the time when the projectile burst 3 will be at its range is called the lead angle (not illustrated).

In order to operate successfully, a positioning system must compute and implement a lead angle which will assure a projectile-target collision. The extent to which the projectile burst 3 fails to hit the target 2 when at its range, is known as misdistance and is measured by an angle E. It is noted that FIG. 1 is not to scale. A nominal distance from the aircraft 1 to the target 2 is 2,000 yards. As illustrated in FIG. 1, the distance between the range of the projectile burst 3 and target 2 are virtually the same. The projectile burst 3 may comprise one or a plurality of projectiles, and the term is used here to describe something that is resolvable by a radar as a single object and whose path defines a straight line.

In order to acquire and track the target 2, the aircraft 1 utilizes a radar system (illustrated in FIG. 2) having a boresight 5 and radiation lobes 6. The aircraft 1 has a vector 10 which is indicative of its velocity and direction; the velocity and direction of the target 2 is described by a vector 11.

The boresight 5 of a nominal radar system may be skewed from the vector 10 by up to a small angle, for example 10°, this angle being exaggerated in FIG. 1 for purposes of illustration.

The aircraft 1 utilizes a conventional radar system to search for the target 2 in a conventional manner. Once the target 2 is acquired by the radar, the radar system by means of timing circuitry (shown in FIG. 2) places a range gate 13 around the target 2. A range gate is a range at which the radar receiver will be responsive to echo pulses received therefrom. An example of a width for a range gate in an airborne attack radar is 200 feet. The range gate is provided by timing the radar receiver so that it is responsive at a time interval during which echo pulses will return from the range included in the range gate. Utilizing the monopulse apparatus of FIG. 2, velocity, azimuth and elevation information of the target 2 is derived.

In accordance with the method of the present invention, a second range gate 15 is placed near the range gate 13 by means of further timing circuitry (FIG. 2) to derive information from each projectile burst 3 directed at the target 2. Preferably, the range gate 15 is as close as possible to the range gate 13 while still being distinguishable therefrom. The range gate 15 may be placed on either side of the range gate 13. The range gate 15 is preferably closer to the aircraft 1 to avoid any possibility of the target 2 masking a projectile burst 3. The radar provides signals respectively indicative of the energy returned from the first and second range gates 13 and 15. The signals indicative of energy reflected from the first range gate 13 are processed in a conventional manner, e.g. by Doppler filtering and detection. A first group of outputs is provided which are indicative of velocity and position of the target 2. The position output is commonly comprised of an azimuth output and an elevation output. In addition, signals indicative of the energy reflected from the second range gate are processed to provide output indicative of the velocity of a projectile burst within the second range gate 15, in one form of the invention. In another form of the invention, additional outputs are provided indicative of angular position of a projectile burst 3 in the range gate 15 with respect to the target 2 in the range gate 13. Both signal processing operations are performed concurrently within the span of one pulse repetition period of the radar. The output signals are supplied to a fire control computer (FIG. 2) which is programmed in accordance with well-known ballistic theory to provide an output indicative of misdistance. By supplying new outputs to the fire control computer from the signal processing circuitry during successive pulse repetition periods, the equations in the fire control computer are updated. Consequently, the positioning system responds in real time to misdistance.

Further, in accordance with the present invention, misdistance of the projectile burst 3 from the target 2 is minimized, and an indication thereof is provided. This is accomplished by applying the output of the fire control computer to responsive means. The responsive means could comprise, for example, a control system for mechanically positioning a cannon 27 in response to the output of the fire control computer (FIG. 2) or readout or recording means.

The circuitry and further apparatus through which the invention was achieved is further illustrated in FIG. 2 in which a radar system is shown in block diagramatic form, gun control circuitry as illustrated in block diagramatic form, and an airborne cannon is also illustrated. It should be noted that the present invention is not limited to radar systems, but may also be achieved through the use of any reflected wave object detected system which provides velocity, range, azimuth and elevation information about a target. The present invention could be embodied in a sonar system, for example, and doubtless in the future will find application in other object detection systems.

In the radar system of FIG. 2, conventional transmitting circuitry is used and therefore is not discussed here.

In the embodiment of FIG. 2, reflected echo pulses are received by a monopulse antenna 20 coupled to a conventional hybrid 21 which provides sum signals, delta-azimuth and delta-elevation signals to intermediate frequency and amplifier stages 22, 23 and 24 respectively. Signals of these stages are processed to provide inputs to a fire control computer 25 which, in turn, provides a control signal to a gun control servo system 26 which, in turn, is mechanically coupled for positioning an airborne cannon 27.

The sum channel output, i.e. the output of the intermediate frequency and amplifier stage 22, is coupled to a target Doppler filter and range gate tracker 30 which processes the sum signal and provides timing signals to range gated Doppler filters 31 and 32 which are connected to the outputs of the intermediate frequency and amplifier stages 23 and 24 respectively. These timing signals enable the Doppler filters 30, 31 and 32 to respond to echo pulses returned from a first range gate, for example, the range gate 13 of FIG. 1. In the preferred form, an output is coupled from the target Doppler filter and range gate tracker 30 to a projectile range gate offset and Doppler filter 33 which includes timing circuitry to provide a range gate, such as range gate 15 of FIG. 1, distinguishable from the range gate 13 by providing the timing offset signals to the range gated Doppler filters 31 and 32. In this form, the range gates 13 and 15 are movable simultaneously when the timing circuitry of the target Doppler filter and range gate tracker 30 is timed to provide a new range gate 13. Alternatively, the projectile range gate offset and Doppler filter 33 may include independent timing means so that the range gate 15 may be moved independently of the range gate 13.

When the range gated Doppler filters are responsive to echo pulses from the range gate 13, they provide target delta-azimuth and target delta-elevation signals to target monopulse circuits 35 and 36 respectively. When the range gated Doppler filters 31 and 32 are responding to echo pulses from range gate 13, they provide projectile delta-azimuth and projectile delta-elevation signals to projectile monopulse circuits 37 and 38. Each of the monopulse circuits 35-38 is a signal processing circuit which provides an output to the fire control computer indicative of the position of the degree of freedom for the object by which its output signal is named. The target monopulse circuits 35 and 36 are provided with a normalizing sum signal from the target Doppler filter and the range gate tracker 30; the projectile range gate off-set and Doppler filter 33 provides a normalizing sum signal input to the projectile monopulse circuits 37 and 38.

The target Doppler range gate tracker 30 and projectile range gate off-set and Doppler filter 33 are coupled to the fire control computer 25 to provide inputs indicative of target range, target velocity, projectile velocity and projectile range from the sum channel. The range gated Doppler filters 31 and 32 provide inputs coupled to the fire control computer 25 indicative of target and projectile velocity from the delta-azimuth and delta-elevation channels.

The fire control computer 25 computes the above described lead angle and provides an output indicative thereof to responsive means. The responsive means may comprise a gun control servo system 26 mechanically coupled to the gun airborne cannon 27 to position it with respect to the boresight 5 (FIG. 1) to provide the desired lead angle to produce a projectile-target collision. Closed loop control of the position of the airborne cannon 27 is provided.

Alternatively, the output of the fire control computer 25 may be coupled to $x$ and $y$ axis transducers 41 and 42 which are, in turn, mechanically coupled to pairs of pistons 43 and 44 to provide incremental open loop-controlled movement of the airborne cannon 27 in desired degrees of freedom. In this embodiment, the gun control servo system 26 may be utilized as a resetting device to reset the airborne cannon 27 to a reference position.

Since the system of the present invention measures actual velocity of a projectile burst 3 and provides information indicative thereof to the fire control computer 25 in real time, corrections of the position of the airborne cannon 27 may be provided prior to the firing of further projectile bursts 3. In addition, errors associated with utilizing a nominal velocity or muzzle velocity of the projectiles within the projectile burst 3 are eliminated. It should be noted that since the velocity of projectiles is measured within a range gate near the target, the method and system of the present invention works equally well for a single or multibarreled aircraft cannon 27. Further, since actual misdistance between a projectile burst 3 and the target 2 is measured, greatest accuracy of operation is obtained. The present invention thus provides a new system for positioning an airborne cannon or other positionable device which is not airborne. The provision of information from first and second range gates to a monopulse radar system also comprises a new method for updating fire control equations in a computer and a new method for determining misdistance.

What is claimed as new and desired to be secured by Letters Patent of the United States is:

1. In a reflected wave object detection system, a system for providing inputs to a fire control computer comprising, in combination:
   (a) first means providing a first range gate for enabling the reflected wave object detection system to respond to energy reflected from a target;
   (b) second means providing a second range gate a preselected distance and distinguishable from said first range gate for enabling the reflected energy object detection system to respond to energy reflected from a projectile burst;
   (c) means providing signals to the fire control computer indicative of velocity and position of the target; and
   (d) means providing signals to the fire control computer indicative of the velocity of the projectile burst for aiming a next projectile burst.

2. A system according to claim 1 further comprising means for providing signals to the fire control computer indicative of the position of the projectile burst.

3. A fire control system comprising, in combination:
   (a) a monopulse radar;
   (b) first timing means in said radar providing a first range gate;
   (c) first signal processing means for providing outputs indicative of the signals received from said first range gate;
   (d) second timing means in said radar providing a second range gate distinguishable from the first range gate, and placed on one side of said first range gate;
   (e) signal processing means for providing outputs indicative of the signals received from said second range gate, including an output indicative of velocity; and
   (f) a gun fire control servo computer connected to the outputs of said first and second signal processing means and providing an output comprising a positioning signal for coupling to a control system.

4. A system according to claim 3 including means for moving the first and second range gates simultaneously.

5. A system according to claim 3 including means for moving said first and second range gates independently.

6. A system according to claim 3 further comprising transducer means coupled to the output of said fire control computer for applying an open loop mechanical correction to the position of a cannon.

7. A system according to claim 3 further comprising a closed loop servo system connected to the output of said fire control computer and mechanically coupled to a cannon.

8. A method for updating equations in a fire control computer for aiming a next projectile burst comprising the steps of:
   (a) timing a radar system to respond to energy reflected from a first range gate containing a target;
   (b) timing a radar system to respond to energy reflected from a second range gate distinguishable from the first range gate;
   (c) processing signals indicative of energy reflected from the first range gate to provide first output signals indicative of the velocity and position of the target;
   (d) processing signals indicative of energy reflected from the second range gate to provide second output signals indicative of the velocity of projectile bursts in the second range gate; and
   (e) supplying said first and second output signals to a fire control computer for aiming a next projectile burst.

9. The method according to claim 8 further comprising the step of processing signals indicative of the energy reflected from the second range gate to provide further second output signals indicative of the position of projectile bursts in the second range gate.

10. A method for providing an indication of the angular misdistance between a target and a projectile burst comprising the method of claim 8 and the further step of supplying outputs of the fire control computer to responsive means.

* * * * *